(12) United States Patent
Abrol et al.

(10) Patent No.: US 7,403,498 B2
(45) Date of Patent: Jul. 22, 2008

(54) METHOD AND APPARATUS FOR SELECTIVE EXAMINATION OF PPP PACKETS FOR RENEGOTIATION OF A PPP LINK ON A $U_M$ INTERFACE

(75) Inventors: Nischal Abrol, San Diego, CA (US); Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 793 days.

(21) Appl. No.: 09/871,479

(22) Filed: May 31, 2001

(65) Prior Publication Data

US 2002/0181510 A1 Dec. 5, 2002

(51) Int. Cl.
*H04B 7/212* (2006.01)
(52) U.S. Cl. ..................... 370/324; 370/349
(58) Field of Classification Search ................ 370/401, 370/402, 304, 350, 331, 324, 349, 328, 310.2, 370/338, 310, 503, 509, 510, 512
See application file for complete search history.

(56) References Cited

U.S. PATENT DOCUMENTS

| | | | | |
|---|---|---|---|---|
| 5,761,619 | A * | 6/1998 | Danne et al. | 455/422.1 |
| 5,920,545 | A * | 7/1999 | Rasanen et al. | 370/232 |
| 6,230,012 | B1 * | 5/2001 | Willkie et al. | 455/435.1 |
| 6,385,451 | B1 * | 5/2002 | Kalliokulju et al. | 455/437 |
| 6,421,539 | B1 * | 7/2002 | Jeong | 455/442 |
| 6,487,218 | B1 * | 11/2002 | Ludwig et al. | 370/469 |
| 6,519,235 | B1 * | 2/2003 | Kim et al. | 370/331 |
| 6,625,164 | B1 | 9/2003 | Lioy | |
| 6,721,555 | B1 * | 4/2004 | Phillips et al. | 455/411 |
| 6,728,536 | B1 * | 4/2004 | Basilier et al. | 455/432.1 |
| 6,757,270 | B1 * | 6/2004 | Kumar et al. | 370/342 |
| 2003/0032409 | A1 * | 2/2003 | Hutcheson et al. | 455/414 |

OTHER PUBLICATIONS

Interim Standard IS-707.5, "Data Service Options for Wideband Spread Spectrum Systems: Packet Data Services," pub. Feb. 1998.
IS-707-A-1 "Data Service Options for Wideband Spread Spectrum Systems", Addendum 1, pub. Dec. 1999.
IS-707-A-2 "Data Service Options for Wideband Spread Spectrum Systems," Addendum 2. pub. Mar. 2001.
3GPP2.P.S0001-IS-835 "cdma2000 Wireless IP Network Standard," pub. Dec. 2000.
RFC 1332"The PPP Internet Protocol Control Protocol (IPCP)", Network working Group, pub. May 1992.
IS-707.2 "Data Service Options for Wideband Spread Spectrum Systems: Radio Link Protocol," pub. Feb. 1998.
IS-707-A "Data Service Options for Wideband Spread Spectrum Systems," pub. Apr. 1999.

* cited by examiner

*Primary Examiner*—Brenda Pham
(74) *Attorney, Agent, or Firm*—Kam T. Tam; Abdollah Katbab; Thomas R. Rouse

(57) ABSTRACT

A method and system that provides for efficient re-synchronization of a PPP link on a $U_m$ interface is provided. When the PPP link is connected, if an indication that the communications of the mobile station is associated with a new network server is detected, only the $U_m$ interface will undergo PPP configuration renegotiation. The method and system does not require the examination of all data packets for determining whether PPP configuration renegotiation is required.

25 Claims, 8 Drawing Sheets

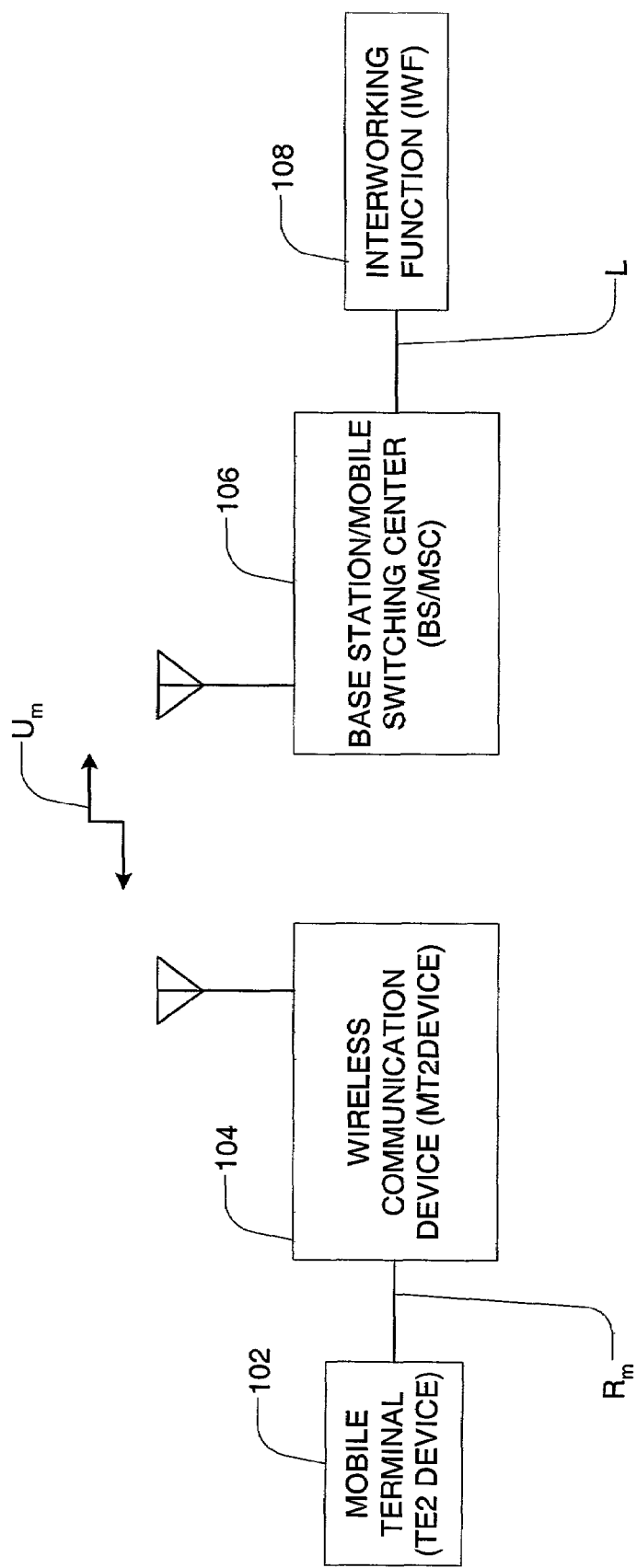
FIG. 1-A

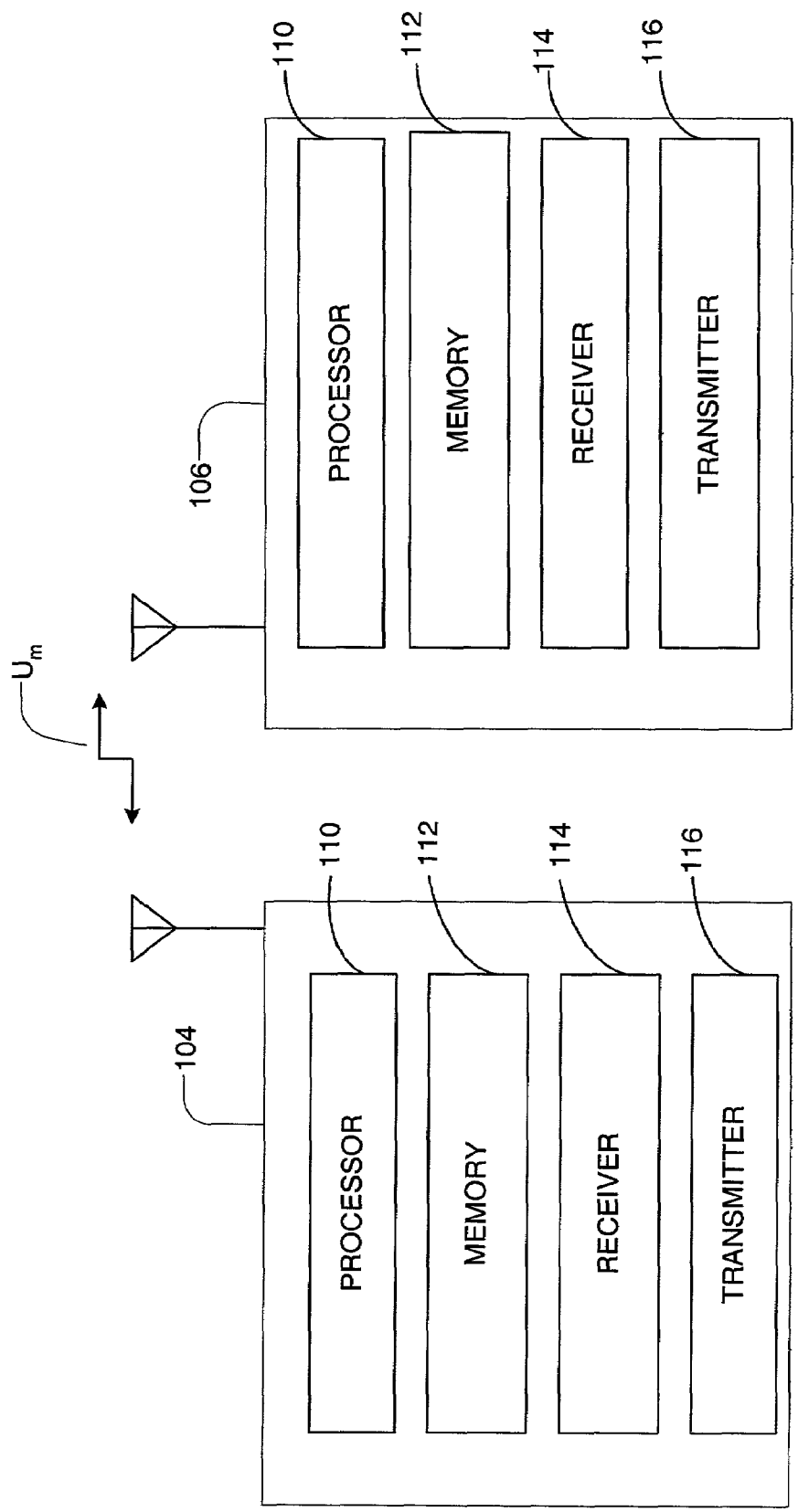
FIG. 1-B

METHOD AND APPARATUS FOR SELECTIVE EXAMINATION OF PPP PACKETS FOR RENEGOTIATION OF A PPP LINK ON A $U_M$ INTERFACE

BACKGROUND

1. Field

The present invention relates to the field of wireless data services. More particularly, the present invention relates to a novel and improved method and system for efficiently re-synchronizing a Point-to-Point Protocol (PPP) link over a $U_m$ interface between a wireless communication device (MT2) and a Base Station/Mobile Switching Center (BS/MSC) or Radio Network (RN).

2. Background

Internetworking, i.e., the connection of individual Local Area Networks (LANs), has rapidly become very popular. The infrastructure and associated protocols commonly referred to as the "Internet" have become well known and widely used. A well-known protocol for providing access to the Internet is the Point-to-Point Protocol (PPP) which provides a standard method for transporting multi-protocol datagrams over point-to-point and is further described in Request for Comment (RFC) 1661, Network Working Group, published July 1994, herein incorporated by reference.

PPP includes three main components:

1. A method of encapsulating multi-protocol datagrams;
2. A Link Control Protocol (LCP) for establishing, configuring, and testing a data link connection; and
3. A family of Network Control Protocols (NCPs) for establishing and configuring different network-layer protocols.

When a wireless communication device (MT2) is in connected state with the same Interworking Function (IWF) or Packet Data Serving Node (PDSN), normally there would be no need for PPP renegotiation. However, because the wireless communication device (MT2) is mobile, the wireless communication device (MT2) may move to an area that is served by a new IWF or PDSN. When this happens, the LCP and IPCP links need to be renegotiated over the $U_m$ interface. Examining every PPP packet that passes through the MT2, to determine whether PPP option renegotiation is required on the $U_m$ interface, may be CPU intensive, especially at high data rates. Because PPP negotiation for the $R_m$ and $U_m$ interfaces are independent, PPP renegotiation need only occur on the $U_m$ interface.

There is therefore a need in the art for efficient PPP renegotiation that examines only selective PPP packets to determine whether PPP re-synchronization on the $U_m$ interface is required.

SUMMARY

According to one aspect of the present invention, an efficient PPP renegotiation scheme for a $U_m$ interface is provided that does not require examining all PPP packets for renegotiation once a PPP connection has been established. According to another aspect of the invention, an established PPP link may be renegotiated when a trigger indicates a need for PPP renegotiation. The triggers may include an RLP reset, indicating that the MT2 has been handed off to a new BS/MSC or RN; a signaling message such as UHDM or GHDM indicating a handoff; and coming out of dormancy, indicating that RLP is re-established.

Thus, when one of the above triggers occurs, the $U_m$ interface may undergo PPP configuration renegotiation only when necessary, without causing the $R_m$ interface also to undergo PPP configuration renegotiation.

BRIEF DESCRIPTION OF THE DRAWINGS

These and other advantages will become more apparent from the detailed description of the preferred embodiments along with the following drawings:

FIGS. 1-A and 1-B illustrate a high-level block diagram of wireless data communication systems in which a terminal device connects to a network, such as the Internet, via a wireless communication device;

DETAILED DESCRIPTION

Figure 2:
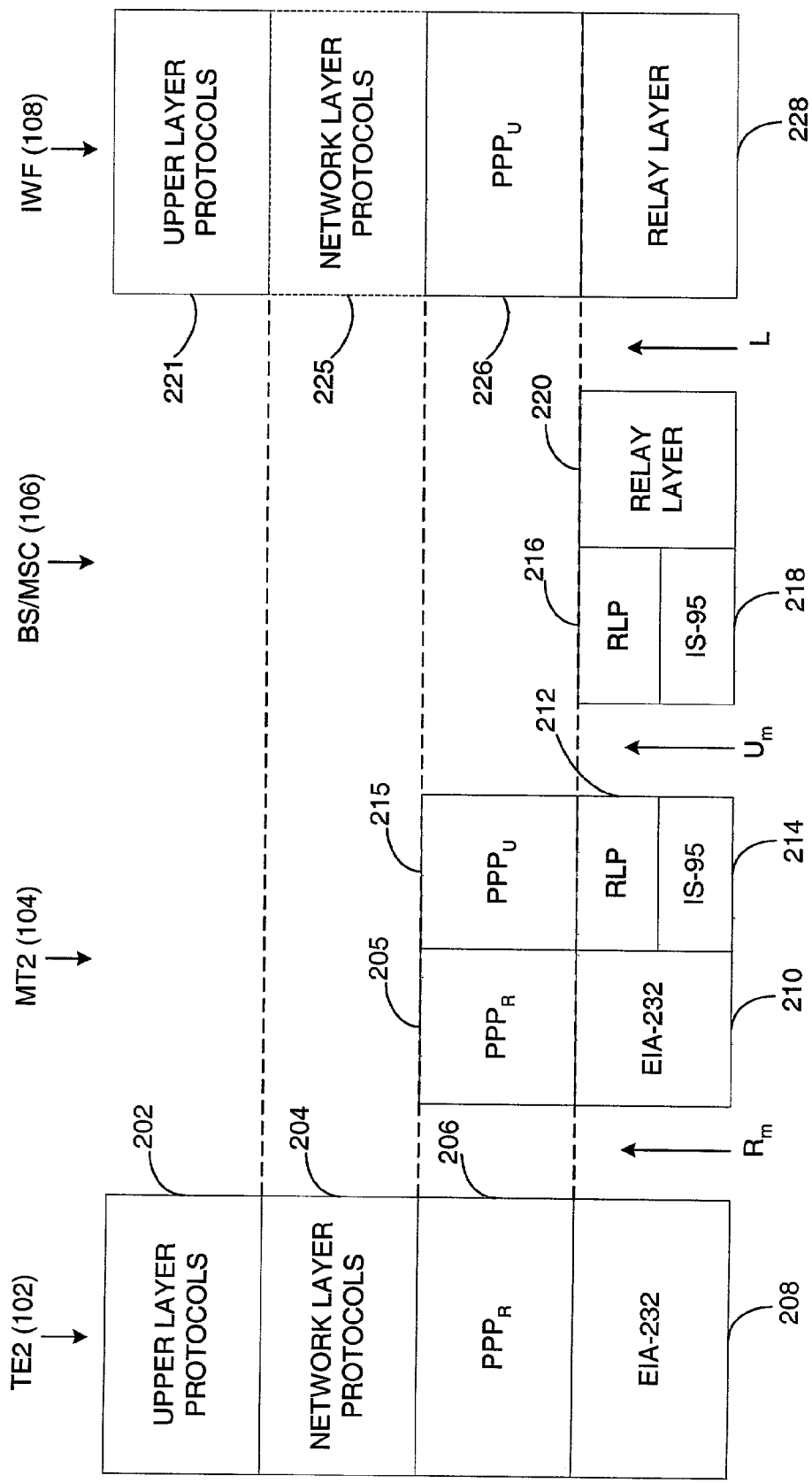
FIG. 2 is a diagram of the protocol stacks of each entity in FIGS. 1A, 1B.

FIG. 1-A illustrates an exemplary high-level block diagram of a wireless data communication system in which a mobile terminal (TE2 device) 102 communicates with the Interworking Function (IWF) 108 via a wireless communication system, which includes a wireless communication device (MT2) 104 and Base Station/Mobile Switching Center (BS/MSC) 106. In FIG. 1-A, the IWF 108 serves as the access point to the Internet. IWF 108 is coupled to, and may be co-located with, BS/MSC 106, which may be a conventional wireless base station, as is known in the art. TE2 device 102, which may include a mobile terminal, laptop or palmtop computer, is coupled to MT2 device 104, which may be a cellular phone in wireless communication with BS/MSC 106 and IWF 108.

Many protocols exist that allow data communication between the TE2 device 102 and the IWF 108. For example, Telecommunications Industry Association (TIA)/Electronics Industries Association (EIA) Interim Standard IS-707.5, entitled "Data Service Options for Wideband Spread Spectrum Systems: Packet Data Services," published February 1998, IS-707-A, entitled "Data Service Options for Wideband Spread Spectrum Systems," published April 1999, IS-707-A-1, entitled "Data Service Options for Wideband Spread Spectrum Systems—Addendum 1," published December 1999, and IS-707-A-2, entitled "Data Service Options for Wideband Spread Spectrum Systems—Addendum 2," published March 2001, herein incorporated by reference, define requirements for support of packet data transmission capability on CDMA wideband spread spectrum systems, of which BS/MSC 106 and IWF 108 may be a part. The above standards also provide the requirements for communication protocols on the links between the TE2 device 102 and the MT2 device 104 (the $R_m$ interface), between the MT2 device 104 and the BS/MSC 106 (the $U_m$ interface), and between the BS/MSC 106 and the IWF 108 (the L interface).

Alternatively, TIA/EIA Interim Standard IS-835, entitled "cdma2000 Wireless IP Network Standard," published December 2000, and herein incorporated by reference, defines requirements for support of packet data networking capability on a third generation wireless system. In such an embodiment, the BS/MSC 106 may be replaced with a Radio Network (RN) and IWF 108 may be replaced with a Packet Data Serving Node (PDSN). IS-835 also provides the requirements for communication protocols on the links between the TE2 device 102 and the MT2 device 104 (the $R_m$ interface), between the MT2 device 104 and the RN 106 (the $U_m$ interface), and between the RN 106 and the PDSN 108 (the R-P interface).

FIG. 1-B illustrates an exemplary high-level block diagram of the wireless communication device (MT2 device) 104 and Base Station/Mobile Switching Center (BS/MSC) 106 of FIG. 1-A. Each of these elements may include a processor 110, a storage device 112, a receiver 114, and a transmitter 116. The processors 110 may be configured to detect a trigger indicating whether the remote station is associated with a BS/MSC or RN 106. The processors 110 may be further adapted to determine whether the BS/MSC or RN is associated with a new IWF or PDSN 108. The memory device 112 may contain instructions and data for conducting the processes that may be conducted by the processors 110. The receivers 114 may be adapted to receive PPP re-synchronization signals, such as configuration request and acknowledge messages. The transmitters 116 may also be adapted to send PPP re-synchronization signals, such as configuration request and acknowledge messages.

Referring now to FIG. 2, a diagram of the protocol stacks in each entity in FIG. 1-A according to the IS707.5 standard is shown. At the far left of the figure, a protocol stack, shown in vertical format, shows the protocol layers running on the TE2 device 102. The TE2 protocol stack is illustrated as being logically connected to the MT2 protocol stack over the $R_m$ interface. The MT2 device 104 is illustrated as being logically connected to the BS/MSC protocol stack over the $U_m$ interface. The BS/MSC protocol stack is illustrated as being logically connected to the IWF 108 protocol stack over the L interface.

Alternatively, FIG. 2 may show the protocol stacks in each entity in FIG. 1-A according to the IS-835 standard. The TE2 protocol stack may be logically connected to the MT2 protocol stack over the $R_m$ interface. The MT2 device 104 may be logically connected to the RN protocol stack over the $U_m$ interface. The RN protocol stack may, in turn, be logically connected to the PDSN protocol stack over the R-P interface.

As an example of the operation of the protocols of FIG. 2, the $PPP_R$ protocol 206 encodes packets from the upper layer protocols 202, 204 and transmits them across the $R_m$ interface using the EIA-232 protocol 208 to the EIA-232-compatible port on the MT2 device running the EIA-232 protocol 210. The present invention is not intended to be limited to a system that uses the EIA-232 protocol since, as is well known in the art, other suitable protocols, such as USB and Bluetooth, may be used. The EIA-232 protocol 210 on the MT2 device receives the packets and passes them to the $PPP_R$ protocol 205. The $PPP_R$ protocol 205 unframes the received packets encapsulated in PPP frames and, when a data connection is up, passes the packets to $PPP_U$ protocol 215, which frames the packets in PPP frames for transmission to a PPP peer located in the IWF (108). The Radio Link Protocol (RLP) 212 and IS-95 or CDMA2000 protocol 214, both of which are well known in the art, may be used to transmit the packets, which are encapsulated in PPP frames, to the BS/MSC or RN 106 over the $U_m$ interface.

The RLP protocol 212 is defined in TIA/EIA/IS-707.2, entitled "Data Service Options for Wideband Spread Spectrum Systems: Radio Link Protocol", published February 1998, which is incorporated herein by reference. A complementary RLP protocol 216 and IS-95 or CDMA2000 protocol 218 in the BS/MSC or RN 106 pass the packets to the relay layer protocol 220 for transmission across the L or R-P interface to relay layer protocol 228. R-P Interface is defined as the A10 and A11 interfaces of the TIA/EIA/IS2001 standard, which is herein incorporated by reference. $PPP_U$ protocol 226 then unframes the received packets and passes them to the network layer protocols 225, which in turn send them out on the Internet to the designation server.

As described in RFC 1661, the Link Control Protocol (LCP) packets comprise a configure-request, a configure-ack, a configure-nak, and a configure-reject. The format of these packets is well known and described in RFC 1661.

The configure-request packet is used to negotiate configuration options. The requested configuration options, in one or both directions of a link, may be negotiated simultaneously.

The configuration-ack packet is transmitted if every configuration option in a received configuration-request packet is recognizable and all values are acceptable.

The configure-nak packet is sent in response to a configuration-request packet when the requested configuration options are recognizable, but some of the values are not acceptable. The options field of the configure-nak packet is filled only with the unacceptable configuration options from the configure-request packet. The configuration options may be "nak'ed" simultaneously.

The configure-reject packet is sent when a received configure-request includes configuration options that are unrecognizable or are not acceptable for negotiation. The options field of the configure-reject contains only the unacceptable configuration options from the configure-request.

The following comprises the well-known configuration options, described in RFC 1661, and defined for the PPP LCP protocol:
1. Maximum-Receive-Unit
2. Authentication-Protocol
3. Quality-Protocol
4. Magic-Number
5. Protocol-Field-Compression
6. Address-and-Control-Field-Compression Internet Protocol Control Protocol (IPCP) is a network control protocol responsible for configuring, enabling, and disabling Internet Protocol (IP) modules on both ends of the PPP link. IPCP is described in Request for Comment (RFC) 1332, "The PPP Internet Protocol Control Protocol (IPCP)", Network Working Group, published May 1992, which is herein incorporated by reference. IPCP configuration options may include IP-Addresses and IP-Compression-Protocol. IPCP uses the same option negotiation mechanism as the Link Control Protocol (LCP).

LCP and IPCP configuration option negotiations may occur separately for both the $R_m$ interface and the $U_m$ interface. That is, LCP or IPCP configuration option negotiation over one of the $R_m$ and $U_m$ interfaces is separate from LCP or IPCP configuration option negotiation over the other of the $R_m$ and $U_m$ interfaces. Therefore, the wireless communication device (MT2) may separately negotiate configuration options over the $R_m$ and $U_m$ interfaces.

To establish communications over a PPP link, LCP packets for establishing, configuring and testing the data link connection may be exchanged over each PPP link, i.e., the $R_m$ and $U_m$ interfaces. The options that are not negotiated may use a predefined default value, as specified by RFC 1661.

Similarly, IPCP packets for negotiating and configuring IPCP configuration options may be exchanged over the $R_m$ and $U_m$ interfaces. The options that are not negotiated may use a predefined default value, as specified by RFC 1332.

As described above, LCP Packets and IPCP packets may include a configure-request, a configure-ack, a configure-nak, and a configure-reject. The format of these packets is well known and described in RFC 1661 and RFC 1332, respectively.

Configuration option negotiations may occur separately for both the $R_m$ interface and the $U_m$ interface. As described in RFC 1661 and RFC 1332, the configure-request packet contains a list of the options being requested and the configuration-ack packet contains a list of the options that the sender may acknowledge.

In order to simplify processing and achieve greater efficiency of processing, as a result of renegotiating the PPP options, the newly negotiated options may be the same as the PPP options used prior to renegotiation. In the event that the newly negotiated PPP options are not the same as the PPP options used prior to renegotiation, the MT2 device may perform additional processing such as described in a co-pending patent application entitled "Selectively Unframing and Framing PPP Packets Depending On Negotiated Options of the $U_m$ and $R_m$ Interfaces", having Ser. No. 09/353,109, filed Jul. 14, 1999, now U.S. Pat. No. 6,625,164, which is assigned to the same assignee and herein incorporated by reference.

Figure 3:
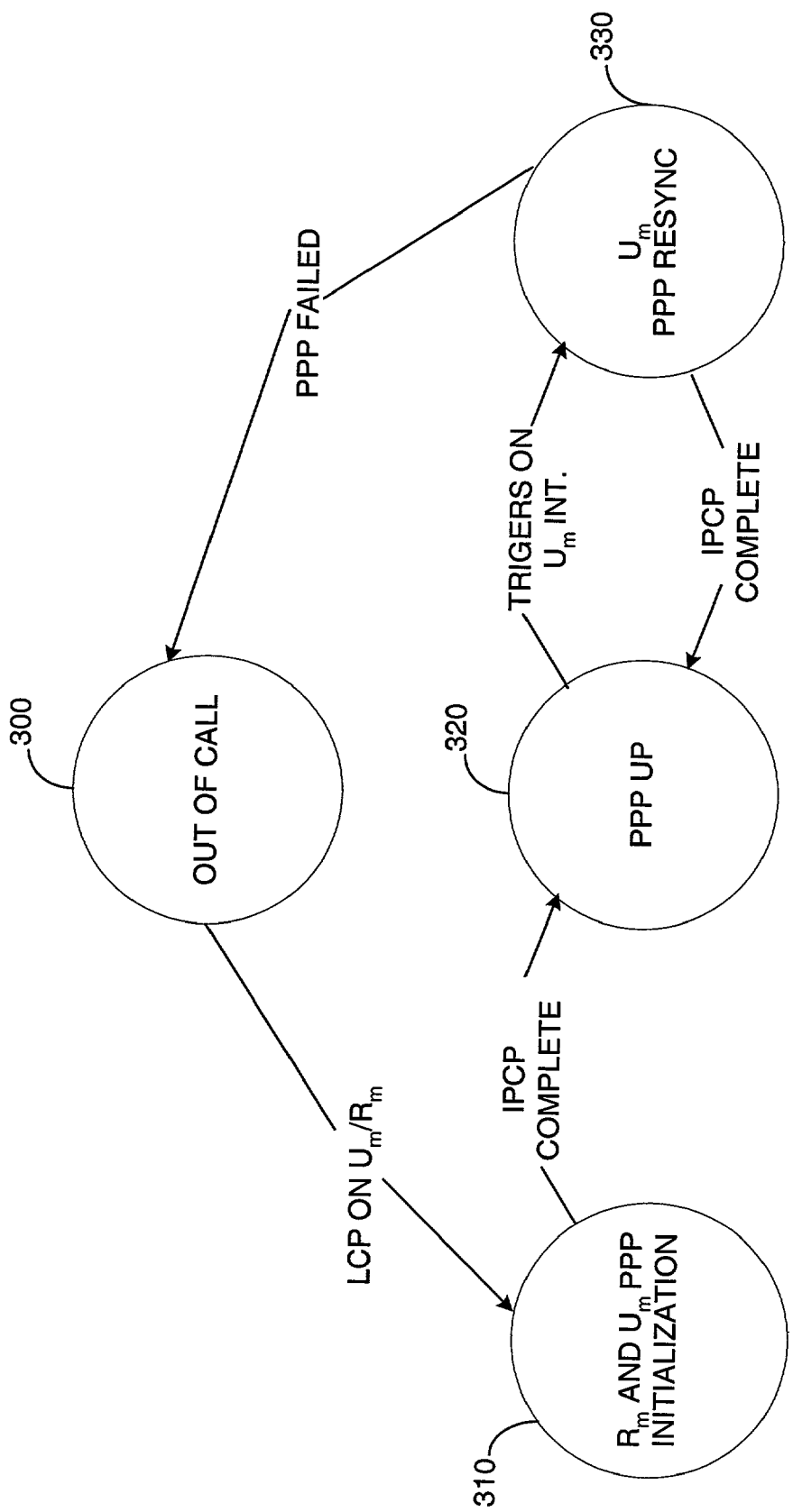
FIG. 3 is a state transition diagram that illustrates the state transitions for PPP option negotiation.

According to one embodiment of the present invention, PPP options may be negotiated during a call setup process. FIG. 3 illustrates a state transition diagram according to one embodiment of the invention. Initially, PPP is in the "Out of Call" state 300. When an LCP packet is received in the MT2 device 104 from either the $U_m$ or $R_m$ interface, PPP enters the "$R_m$ and $U_m$ PPP Initialization" state 310. In this state, PPP option negotiation occurs on both the $R_m$ and $U_m$ interfaces. When LCP configuration negotiations are complete, then IPCP configuration negotiations are performed. When IPCP negotiations are completed, PPP enters the "PPP Up" state 320. After option negotiation is completed on both the $R_m$ and $U_m$ interfaces, and data transfer is taking place in "PPP UP" state 300, if a trigger occurs on the $U_m$ interface, a re-synchronization operation as described below may be performed. According to one embodiment of the present invention, while two peers are continuously connected in the "PPP Up" state 320, no PPP renegotiation may be needed unless a new call set up is required, which requires going to states 300 through 320, or a trigger that indicates a need for PPP renegotiation is detected. Upon detecting such an indication that PPP renegotiation is necessary, packet data transfer may be suspended and the "$U_m$ PPP Resync" state 330 may be entered. In the "$U_m$ PPP Resync" state 330, the MT2 device 104 may renegotiate the LCP and IPCP options. When IPCP option negotiations are completed, the "PPP Up" state 320 is again reentered and data transfer may take place again.

Figure 4:
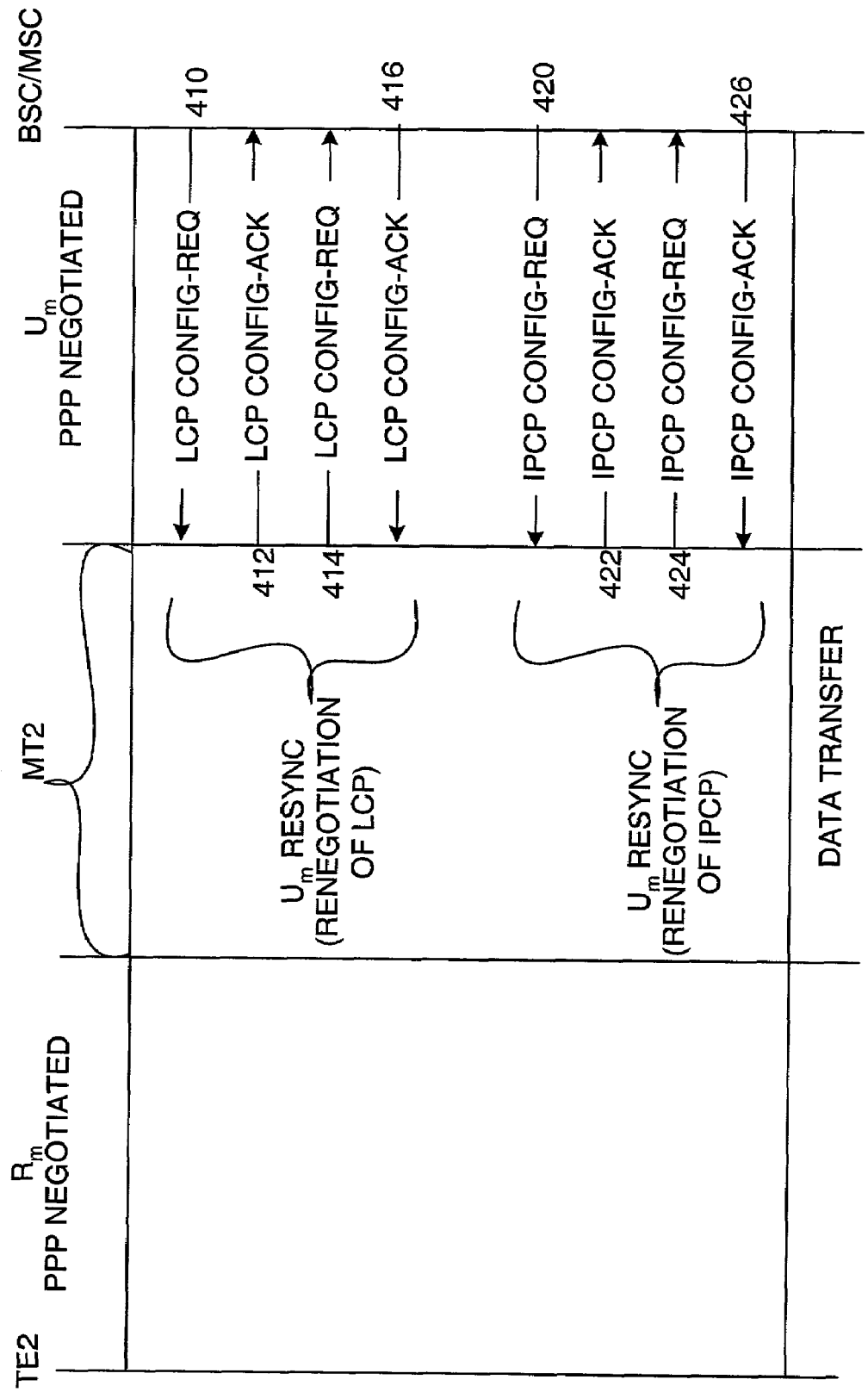
FIG. 4 illustrates the operation of the invention when PPP link on the $U_m$ interface is renegotiated.

FIG. 4 provides an exemplary operation of the "$U_m$ PPP Resynch" state 330 in FIG. 3, after a trigger indicating a need for PPP renegotiation on $U_m$ interface is detected. In message 410, the BSC/MSC or RN 106 sends an LCP configure-request packet over the $U_m$ interface to the MT2 device 104. The MT2 device receives the LCP configure-request packet while in the "PPP Up" state 320, enters the "$U_m$ PPP Resync" state 330, and at reference numeral 412, sends an LCP configure-ack packet. In message 414, the MT2 device sends an LCP configure-request packet and, in message 416, the MT2 device receives an LCP configure-ack packet from the BS/MSC or RN 106. At this point the LCP configuration options for both ends of the $U_m$ interface have been successfully negotiated.

In message 420, the BS/MSC or RN 106 sends an IPCP configure-request packet to the MT2 device. The MT2 device receives the IPCP configure-request packet and, in message 422, responds with an IPCP configure-ack packet. In message 42, the MT2 device sends an IPCP configure-request packet. In message 426, the MT2 device receives an IPCP configure-ack packet from the BS/MSC or RN. At this point IPCP negotiations are complete and the MT2 device enters the "PPP Up" state 320. Thus, the $U_m$ interface may be renegotiated without affecting the $R_m$ interface.

In one embodiment, the triggers that indicate a need for PPP re-synchronization on the $U_m$ interface may include an RLP reset, indicating that the MT2 has been associated with a new BS/MSC; a signaling message, such as UHDM or GHDM, indicating a handoff in which the MT2/TE2 is associated with a new BS/MSC; or coming out of dormancy, indicating that RLP is re-established.

Figure 5:
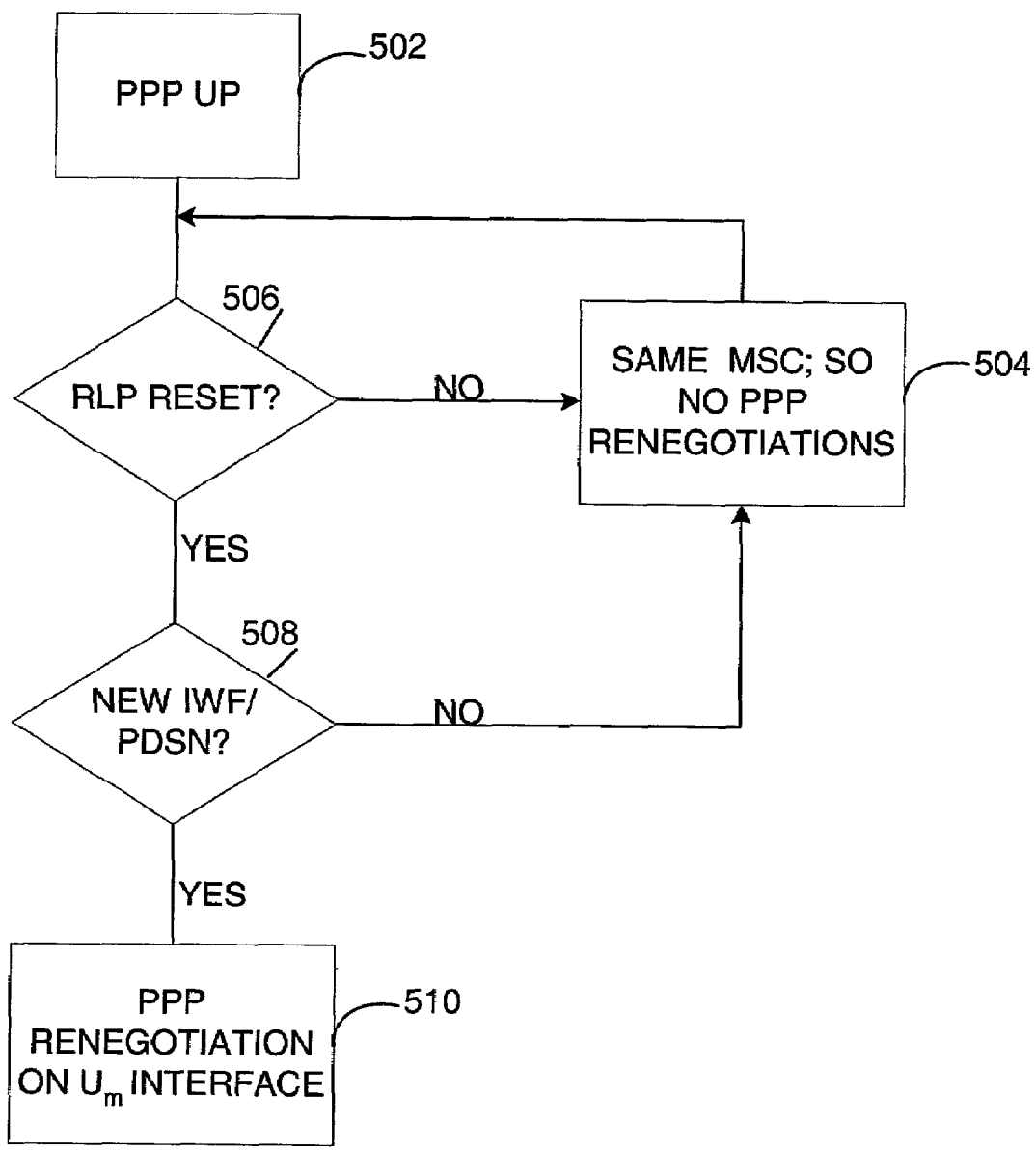
FIG. 5 is a flow diagram that illustrates when PPP renegotiation is required according to a first embodiment of the invention.

FIG. 5 shows, in accordance with one embodiment, when PPP renegotiation on the $U_m$ interface may be required depending on whether an RLP-reset trigger, indicating that the MT2/TE2 is associated with a new BS/MSC or RN, is detected 506. While in the "PPP Up" state 502, if no RLP reset is detected, indicating that the MT2 is associated with the same BS/MSC or RN 106, no PPP renegotiation may be required 504. If, however, an RLP reset is detected 506, indicating that the MT2 104 is associated with a new BS/MSC or RN 106, it may be determined 508 whether the new BS/MSC or RN 106 is associated with a new network server, such as IWF or PSDN 108. If the new BS/MSC or RN 106 is associated with a new IWF or PSDN 108, PPP renegotiation may be performed 510 on the $U_m$ interface, as described above in reference to FIG. 4. If, however, the new BS/MSC or RN 106 is not associated 508 with a new IWF or PSDN 108, no PPP renegotiation is required 504.

In one embodiment, examining the first packet received from the network after an RLP reset may indicate the identification of the new IWF or PSDN 108. If the first packet is a PPP control packet, which may include an LCP and/or IPCP configuration request, the MT2 104 is associated with a new IWF or PSDN 108.

Figure 6:
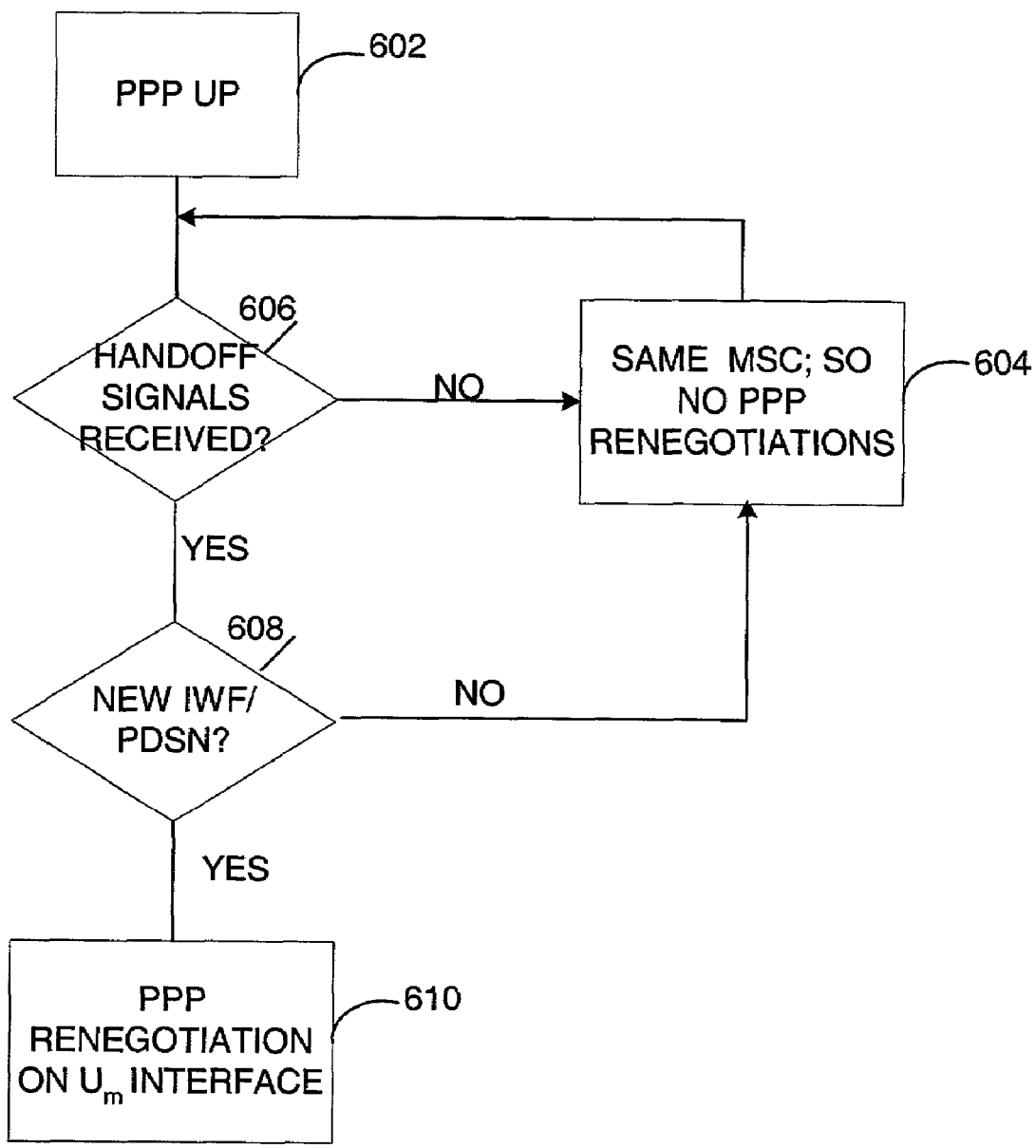
FIG. 6 is a flow diagram that illustrates when PPP renegotiation is required according to a second embodiment of the invention.

FIG. 6 shows, in accordance with one embodiment, when PPP renegotiation on the $U_m$ interface may be required depending on whether a handoff signaling message is detected. In one exemplary embodiment, such messages may include Universal Handoff Direction Message (UHDM) or General Handoff Direction Message (GHDM). Because the wireless communication (MT2) device 104 is typically mobile, communications between the MT2 device 104 and a BSC/MSC or RN 106 may be handed off to another BSC/MSC or RN 106, depending on the location of the MT2. Handoff techniques are well known in the art. Exemplary handoff techniques are described in U.S. Pat. No. 5,267,162, assigned to the assignee of the present invention. When a handoff occurs, the PPP connection on the $U_m$ interface may need to be renegotiated. That is, the LCP and IPCP configuration options may need to be renegotiated over the $U_m$ interface. However, it may not be necessary to renegotiate the PPP configuration options over the $R_m$ interface when the $U_m$ interface is renegotiated.

While in "PPP Up" state 602, if no handoff signaling message is detected 606, indicating that the MT2 104 is associated with the same BS/MSC or RN 106, no PPP renegotiation is required 604. If, however, a handoff-signaling message is detected 606, indicating that the MT2 104 is associated with a new BS/MSC or RN 106, it may be determined 608 whether the new BS/MSC or RN 106 is associated with a new IWF or PSDN 108. If the new BS/MSC or RN 106 is associated with a new IWF or PSDN 108, PPP renegotiation may be performed 610 on the $U_m$ interface, as described above in reference to FIG. 4. If, however, the new BS/MSC or RN 106 is not associated 608 with a new IWF or PSDN 108, no PPP renegotiation is required 604.

Figure 7:
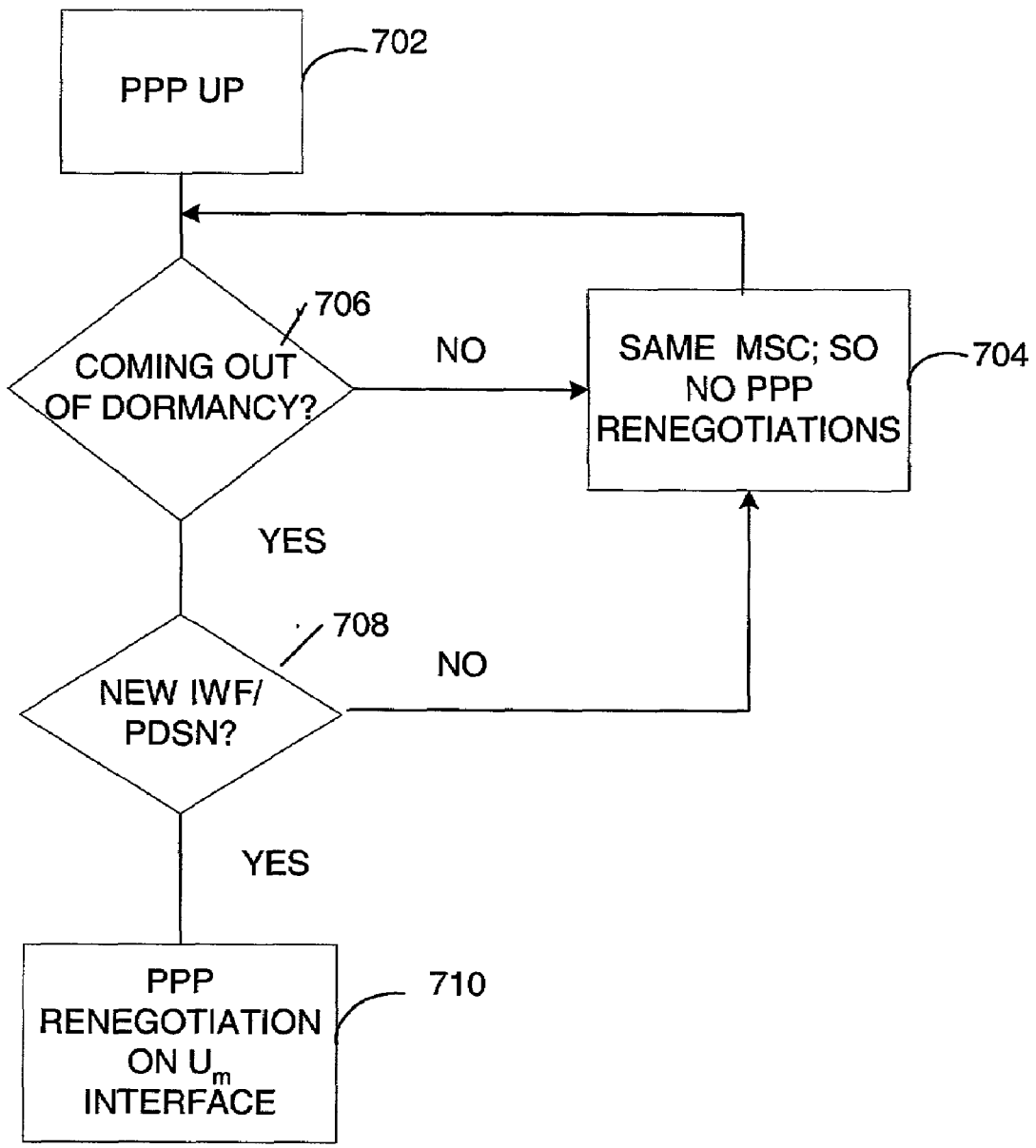
FIG. 7 is a flow diagram that illustrates when PPP renegotiation is required according to a third embodiment of the invention.

FIG. 7 shows, in accordance with one embodiment, when PPP renegotiation on the $U_m$ interface may be required depending on whether an indication of coming out of dormancy is detected. Dormancy state may be defined as when PPP is established between the TE2/MT2 and IWF or PDSN, but no radio resources are available, i.e., there is no traffic channel. During the dormant state, MT2 104 may have been associated with a new BS/MSC or RN 106. Examining when MT2 104 has data to send or to receive, or when the MT2 104 is paged by a BS/MSC or RN 106, may detect coming out of dormancy. While in "PPP up" state 602, if no indication is received 706 that the system is coming out of dormancy, no PPP renegotiation is required 704. If, however, an indication is received 706 that the system is coming out of dormancy, it is determined 708 whether the MT2 104 is associated with a new IWF or PSDN 108. If the MT2 104 is associated with a new IWF or PSDN 108, PPP renegotiation may be performed 710 on the $U_m$ interface, as described above in reference to FIG. 4. If, however, the MT2 104 is not associated 708 with a new IWF or PSDN 108, no PPP renegotiation is required 704.

Thus, by examining only selective PPP packets to determine whether PPP renegotiation is required, the disclosed embodiments provide an efficient scheme for PPP renegotiation on $U_m$ interface.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The word "exemplary" is used exclusively herein to mean "serving as an example, instance, or illustration." Any embodiment described herein as "exemplary" is not necessarily to be construed as preferred or advantageous over other embodiments.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for re-synchronizing a PPP link, comprising:
   detecting a trigger indicating whether a remote station associated with an existing network server is associated with a new base station, wherein the trigger is detected after PPP option negotiation has been completed on both an $R_m$ interface and a $U_m$ interface;
   determining whether the new base station is associated with a new network server;
   re-synchronizing the PPP link on the $U_m$ interface if the remote station is associated with the new network server, wherein the PPP link on the $U_m$ interface is re-synchronized without re-synchronizing the PPP link on the $R_m$ interface or affecting the PPP link on the $R_m$ interface; and
   maintaining existing synchronization of the PPP link with the existing network server if the new base station is associated with the existing network server.

2. The method according to claim 1, wherein the detecting comprises detecting an RLP reset.

3. The method according to claim 1, wherein the detecting comprises detecting a message indicating a handoff.

4. The method according to claim 1, wherein the detecting comprises detecting coming out of dormancy.

5. The method according to claim 1, wherein the determining comprises determining whether a received packet is a control packet.

6. The method according to claim 5, wherein the control packet comprises a link control protocol (LCP) negotiation request.

7. The method according to claim 5, wherein the control packet comprises an Internet protocol control protocol (IPCP) negotiation request.

8. The method according to claim 1, wherein the network server comprises an interworking function (IWF).

9. The method according to claim 1, wherein the network server comprises a packet data serving node (PDSN).

10. The method according to claim 1, wherein the remote station functions under a CDMA environment.

11. A method for re-synchronization of a PPP link, comprising:
    establishing a PPP link associated with an existing network server;
    detecting a condition that indicates whether PPP re-synchronization is required, wherein the condition is detected after PPP option negotiation has been completed on both an $R_m$ interface and a $U_m$ interface;
    determining whether a new base station is associated with a new network server;
    re-synchronizing the PPP link on the $U_m$ interface if it is determined that PPP re-synchronization is required, wherein the PPP link on the $U_m$ interface is re-synchronized without re-synchronizing the PPP link on the $R_m$ interface or affecting the PPP link on the $R_m$ interface; and maintaining existing synchronization of the PPP link with the existing network server if the new base station is associated with the existing network server.

12. The method according to claim 11, wherein the detecting comprises detecting when an RLP reset occurs.

13. The method according to claim 11, wherein the detecting comprises detecting when a handoff occurs.

14. The method according to claim 11, wherein the detecting comprises detecting when coming out of dormancy.

15. A computer-readable medium encoded therein with computer-executable instructions executable by a computer for:
    detecting a trigger indicating whether a remote station associated with an existing network server is associated with a new base station, wherein the trigger is detected after PPP option negotiation has been completed on both an $R_m$ interface and a $U_m$ interface;
    determining whether the new base station is associated with a new network server;
    re-synchronizing the PPP link on the $U_m$ interface if the remote station is associated with the new network server, wherein the PPP link on the $U_m$ interface is re-synchronized without re-synchronizing the PPP link on the $R_m$ interface or affecting the PPP link on the $R_m$ interface; and
    maintaining existing synchronization of the PPP link with the existing network server if the new base station is associated with the existing network server.

16. A remote station apparatus comprising:
    means for detecting a trigger indicating whether the remote station associated with an existing network server is associated with a new base station, wherein the trigger is detected after PPP option negotiation has been completed on both an $R_m$ interface and a $U_m$ interface;
    means for determining whether the new base station is associated with a new network server;
    means for re-synchronizing a PPP link on the $U_m$ interface if the remote station is associated with the new network server, wherein the PPP link on the $U_m$ interface is re-synchronized without re-synchronizing the PPP link on the $R_m$ interface or affecting the PPP link on the $R_m$ interface; and
    means for maintaining existing synchronization of the PPP link with the existing network server if the new base station is associated with the existing network server.

17. A base station apparatus comprising:
    means for detecting whether a new remote station associated with an existing network server is associated with the base station, wherein the trigger is detected after PPP option negotiation has been completed on both an $R_m$ interface and a $U_m$ interface;
    means for determining whether the base station is associated with a new network server;
    means for re-synchronizing a PPP link on the $U_m$ interface if the base station is associated with the new network server, wherein the PPP link on the $U_m$ interface is re-synchronized without re-synchronizing the PPP link on the $R_m$ interface or affecting the PPP link on the $R_m$ interface; and
    means for maintaining existing synchronization of the PPP link with the existing network server if the base station is associated with the existing network server.

18. A base station apparatus comprising:
    a processor configured to detect a trigger indicating whether a new remote station is associated with the base station associated with an existing network server, wherein the trigger is detected after PPP option negotiation has been completed on both an $R_m$ interface and a $U_m$ interface, the processor being further configured to determine whether the base station is associated with a new network server and maintain existing synchronization of a PPP link with the existing network server if the base station is associated with the existing network server, wherein the processor is also configured to re-synchronize the PPP link on the $U_m$ interface if the base station is associated with the new network server, and wherein the PPP link on the $U_m$ interface is re-synchronized without re-synchronizing the PPP link on the $R_m$ interface or affecting the PPP link on the $R_m$ interface;
    a receiver configured to receive PPP re-synchronization signals, the receiver being connected to the processor; and
    a transmitter configured to send PPP re-synchronization signals, the transmitter being connected to the processor.

19. The apparatus according to claim 18, wherein the trigger comprises an RLP reset.

20. The apparatus according to claim 18, wherein the trigger comprises a message indicating a handoff.

21. The apparatus according to claim 18, wherein the trigger comprises an indication of coming out of dormancy.

22. A remote station apparatus comprising:
    a processor configured to detect a trigger indicating whether the remote station associated with an existing network server is associated with a new base station, wherein the trigger is detected after PPP option negotiation has been completed on both an $R_m$ interface and a $U_m$ interface, the processor being further configured to determine whether the new base station is associated with a new network server and maintain existing synchronization of a PPP link with the existing network server if the new base station is associated with the existing network server, wherein the processor is also configured to re-synchronize the PPP link on the $U_m$ interface if the new base station is associated with the new network server, and wherein the PPP link on the $U_m$ interface is re-synchronized without re-synchronizing the PPP link on the $R_m$ interface or affecting the PPP link on the $R_m$ interface;
    a receiver configured to receive PPP re-synchronization signals, the receiver being connected to the processor; and
    a transmitter adapted to send PPP re-synchronization signals, the transmitter being connected to the processor.

23. The apparatus according to claim 22, wherein the trigger comprises an RLP reset.

24. The apparatus according to claim 22, wherein the trigger comprises a message indicating a handoff.

25. The apparatus according to claim 22, wherein the trigger comprises an indication of coming out of dormancy.

* * * * *